United States Patent [19]

Dubois et al.

[11] 4,170,623
[45] Oct. 9, 1979

[54] METHOD OF BLOW MOLDING AN ALL PLASTIC DRUM AND COMPRESSION MOLDING A PROJECTION THEREON

[75] Inventors: Robert A. Dubois; George F. Smith, both of Marion, Ohio

[73] Assignee: Greif Bros. Corporation, Delaware, Ohio

[21] Appl. No.: 920,061

[22] Filed: Jun. 28, 1978

Related U.S. Application Data

[63] Continuation-in-part of Ser. No. 888,197, Mar. 20, 1978.

[51] Int. Cl.² ............................................. B29C 17/07
[52] U.S. Cl. .................................. 264/534; 264/541; 425/525
[58] Field of Search ...................... 264/89, 94, 96–99, 264/296, DIG. 33, 534, 541; 425/525

[56] References Cited

U.S. PATENT DOCUMENTS

| | | | |
|---|---|---|---|
| 3,050,773 | 8/1962 | Hagen | 264/98 |
| 3,159,697 | 12/1964 | Tocci | 264/98 X |
| 3,217,360 | 11/1965 | Mason et al. | 264/DIG. 33 |

FOREIGN PATENT DOCUMENTS

| | | | |
|---|---|---|---|
| 1454915 | 5/1969 | Fed. Rep. of Germany | 425/525 |
| 2600829 | 8/1977 | Fed. Rep. of Germany . | |

*Primary Examiner*—Jan H. Silbaugh
*Attorney, Agent, or Firm*—Kane, Dalsimer, Kane, Sullivan and Kurucz

[57] ABSTRACT

An all plastic tubular drum is blow molded into the selected configuration from an extruded parison. The parison is provided with at least two spaced circumferentially extending thickened sections. These thickened sections are captured in a compression mold cavity during the blow molding cycle. Thereafter the captured thickened sections are compression molded into outwardly extending projections, undercuts, reinforcing gussets, or the like.

5 Claims, 9 Drawing Figures

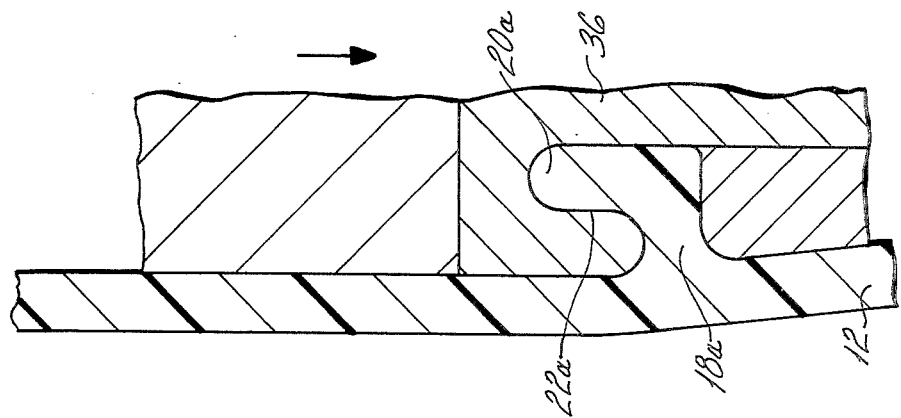
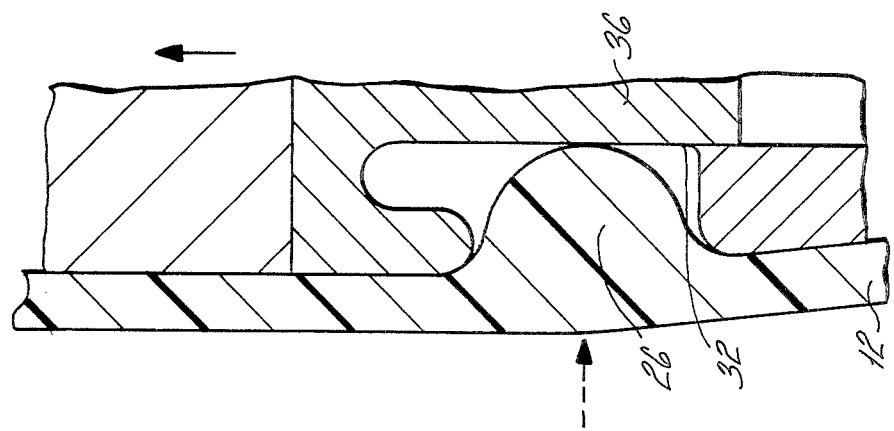
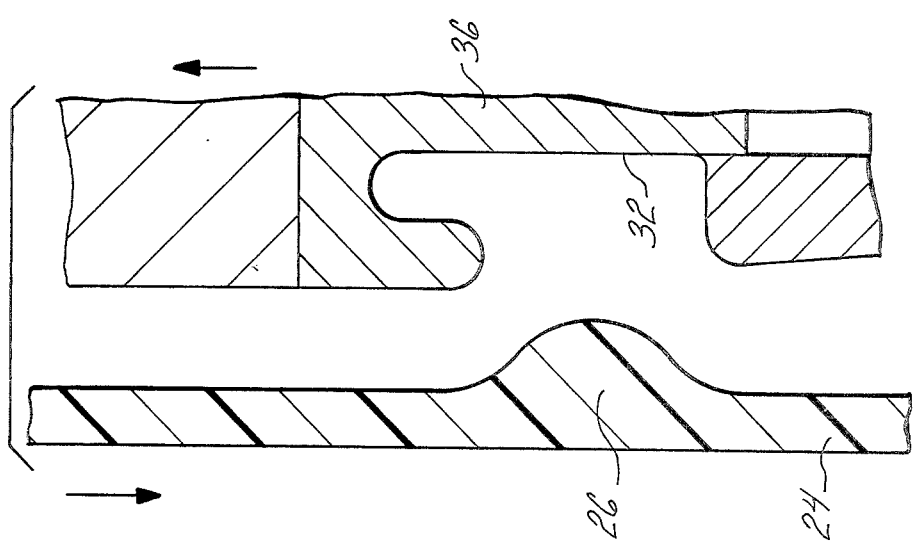

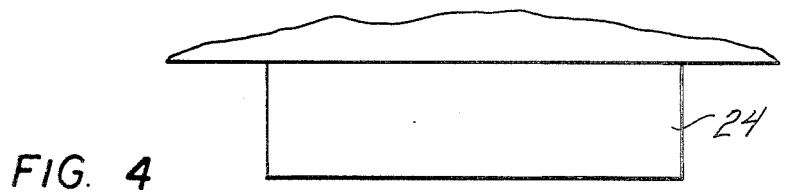
FIG. 4
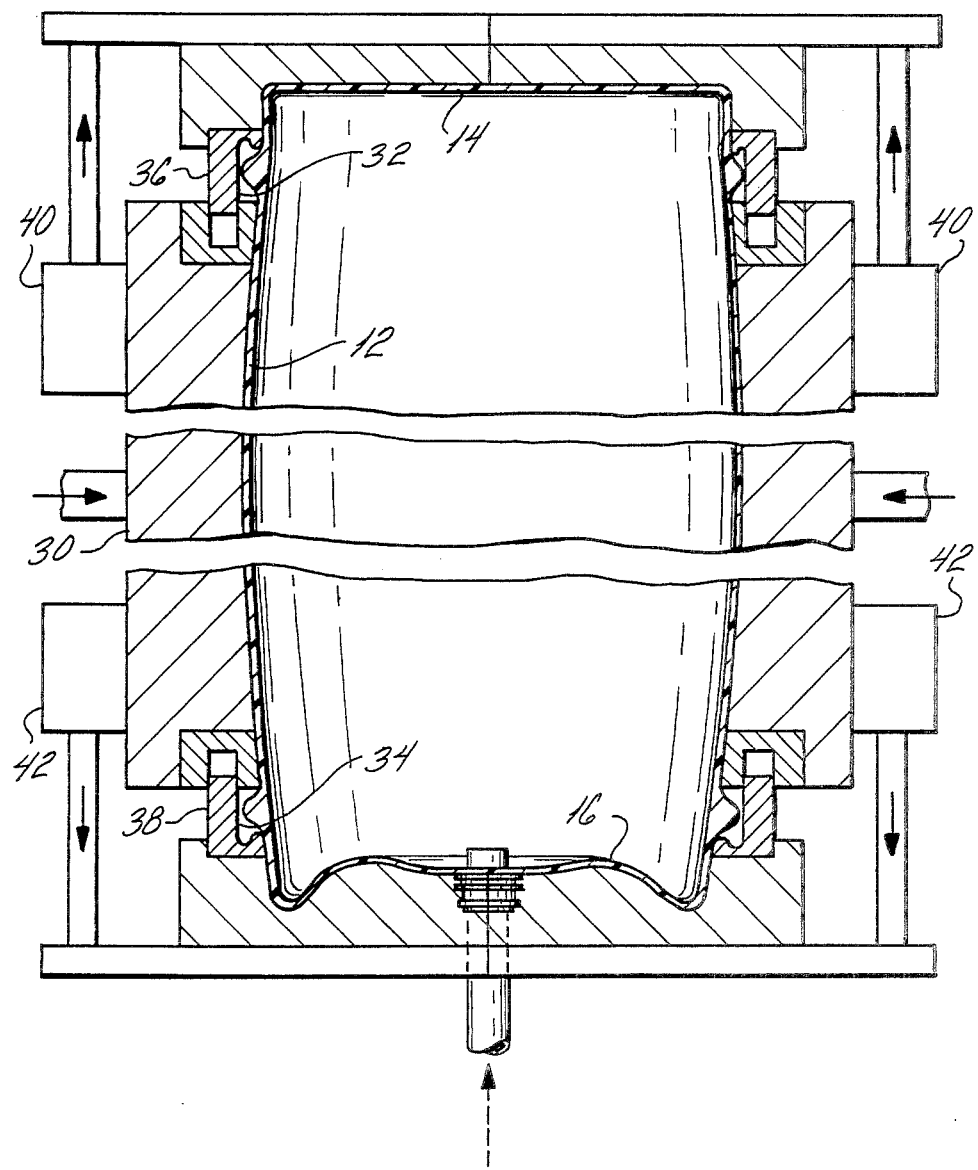

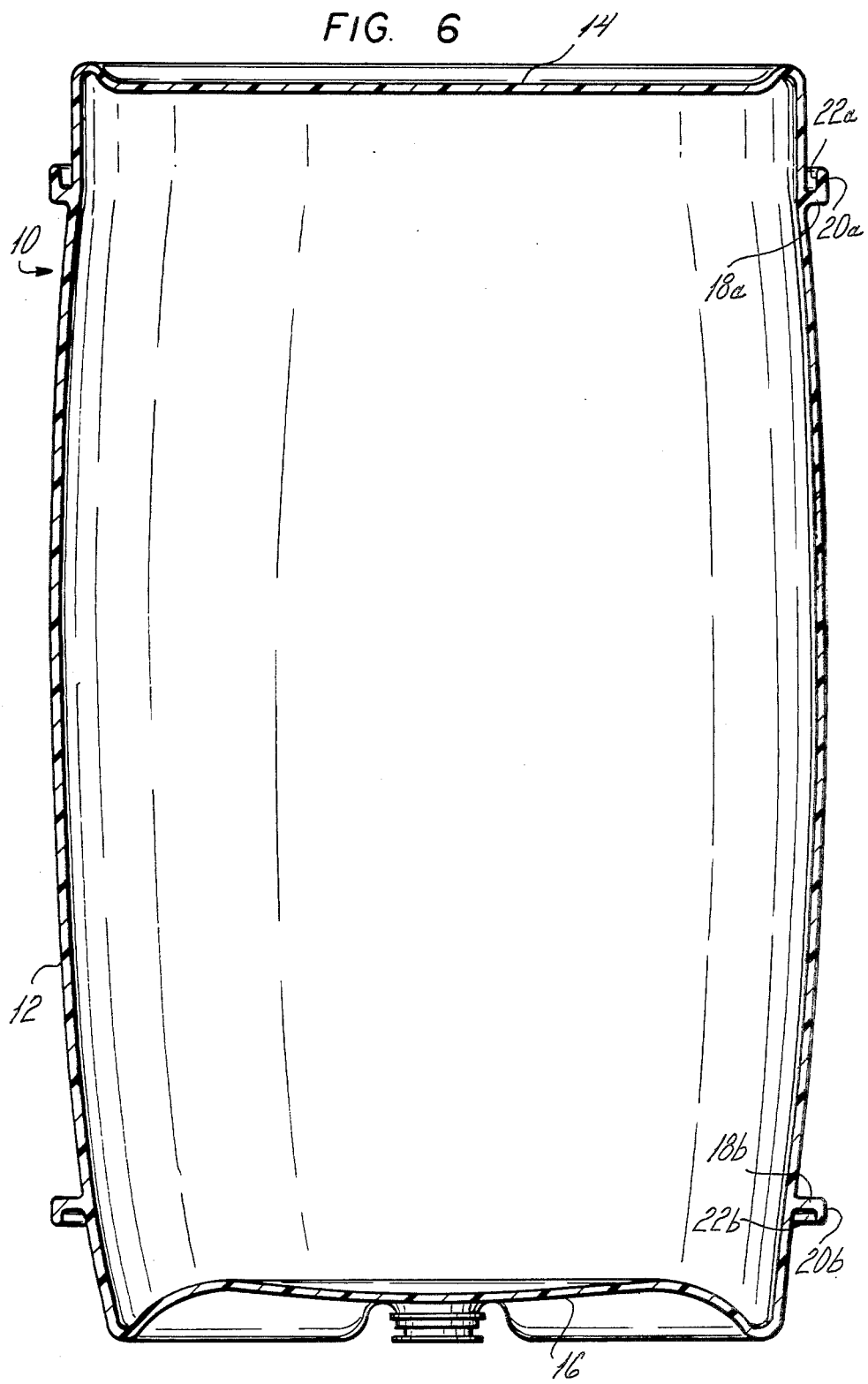

METHOD OF BLOW MOLDING AN ALL PLASTIC DRUM AND COMPRESSION MOLDING A PROJECTION THEREON

REFERENCE TO RELATED APPLICATIONS

This application is a continuation-in-part of application Ser. No. 888,197 filed Mar. 20, 1978 entitled All Plastic Blow Molded Drum.

BACKGROUND OF THE INVENTION

In the above referenced previously filed application, an all plastic blow molded drum is disclosed and includes a tubular outwardly bilged body having an integral upper and bottom closed end each provided with outwardly extending ribs arranged and dimensioned to permit stacking of one drum on top of another similar drum. The upper rib is interrupted with a sealable drain opening disposed in one of the interruptions and a vent opening disposed in the other of such interruptions. A radial circumferentially extending rib on the drum body is located near the upper end and bottom end with each rib provided with a laterally extending flange extending in the direction of the neighboring end, thereby defining a recess for accommodating surfaces of a drum moving device such as a hook or parrot beak lifting device. The radial ribs with lateral flange serve as rolling hoops and extend outwardly in a radial direction an amount substantially the same as that of the bilge of the tubular body side wall whereby the central portions of neighboring drums can touch one another in transport without the upper and lower flanges hooking over or on each other.

SUMMARY OF THE INVENTION

It is the principal object of this invention to provide a method of molding the foregoing all plastic drum.

Another object is to provide a method of blow molding an all plastic drum and at the same time form an outwardly extending projection thereon by a compression molding technique.

Other objects and advantages will become apparent from the following detailed description which is to be taken in conjunction with the accompanying drawings.

BRIEF DESCRIPTION OF THE DRAWINGS

FIG. 4 shows the blow mold closed about the parison with the blow pin cooperating in introducing fluid under pressure to expand the parison into the configuration of the blow mold cavity while the compression mold is open;

FIGS. 3A, 4A and 5A are enlarged fragmentary sectional views of a part of the compression mold showing (i) the parison with extruded thickened sections spaced from but adjacent the open compression mold prior to blow molding (FIG. 3A), (ii) the parison blow into the configuration of the closed blow mold with the thickened section forced into the cavity of the open compression mold (FIG. 4A) and (iii) the compression mold closed to form the outwardly extending projection on the exterior of the blown drum during the blowing cycle (FIG. 5A); and FIG. 6 is a longitudinal sectional view of the drum with outwardly extending projections formed in accordance with the present invention.

DETAILED DESCRIPTION

Figure 1:
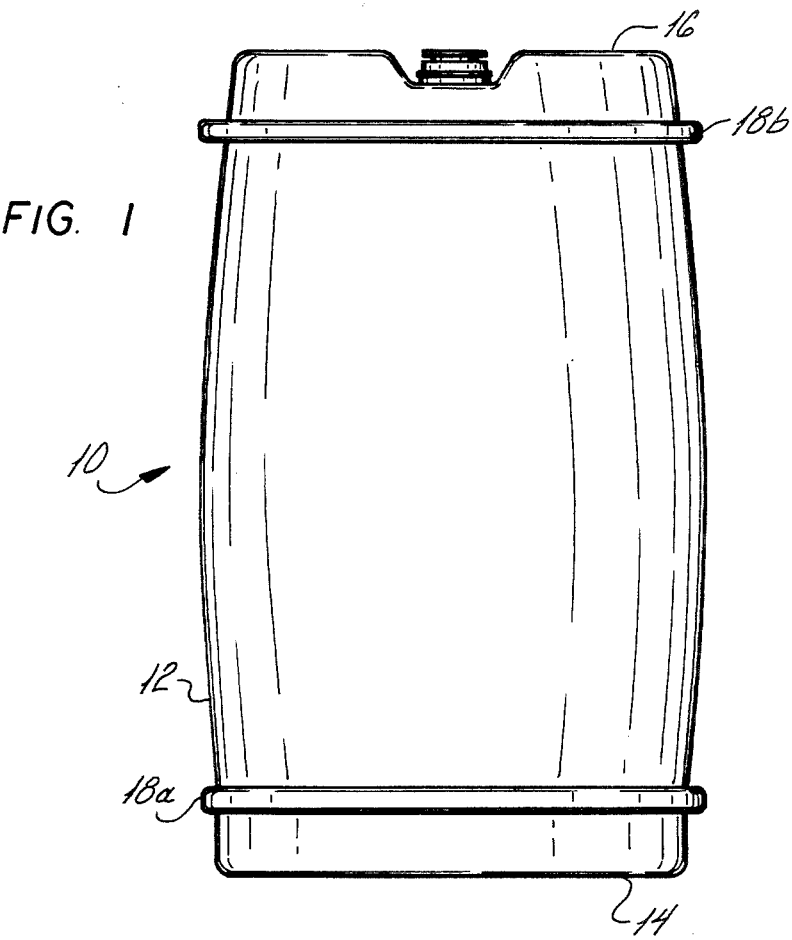
FIG. 1 is a side elevational view of an all plastic blow molded drum produced in accordance with the present invention.
Figure 2:
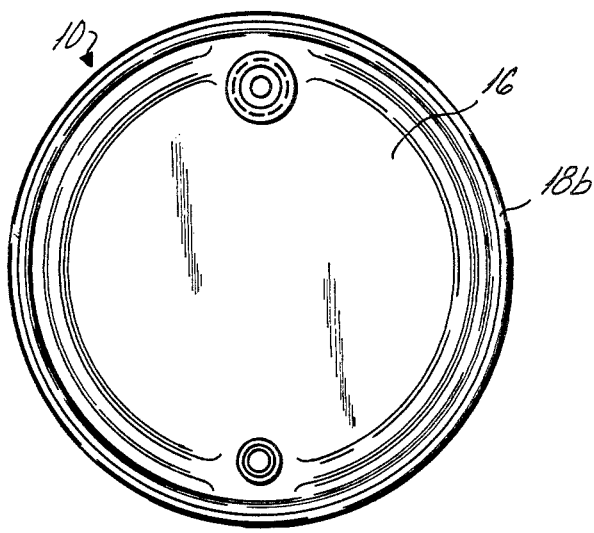
FIG. 2 is a top plan view thereof.

A drum 10 molded according to the present invention includes a body 12 of tubular configuration provided with an integrally formed bottom closed end 14 and an upper closed end 16. In order to facilitate the manipulation and handling of the drum, radially extending ribs 18a and 18b are formed integrally with the tubular body 12. Each rib 18a and 18b extends circumferentially around the periphery of the tubular body 14 and includes laterally extending flanges 20a and 20b, respectively. In addition, each rib defines a recess 22a and 22b, respectively, which advantageously receive and accommodates surfaces of either a chain hook, parrot beak hook or lifting device conventionally employed for moving drums. In addition to the undercut or reinforcing gusset, the present invention contemplates the formation of other forms of laterally extending projections requiring compression molding as a supplement to blow molding as part of a single operation without the need of any secondary operation, especially in the field of manufacturing all plastic drums, containers or the like.

Figure 3:
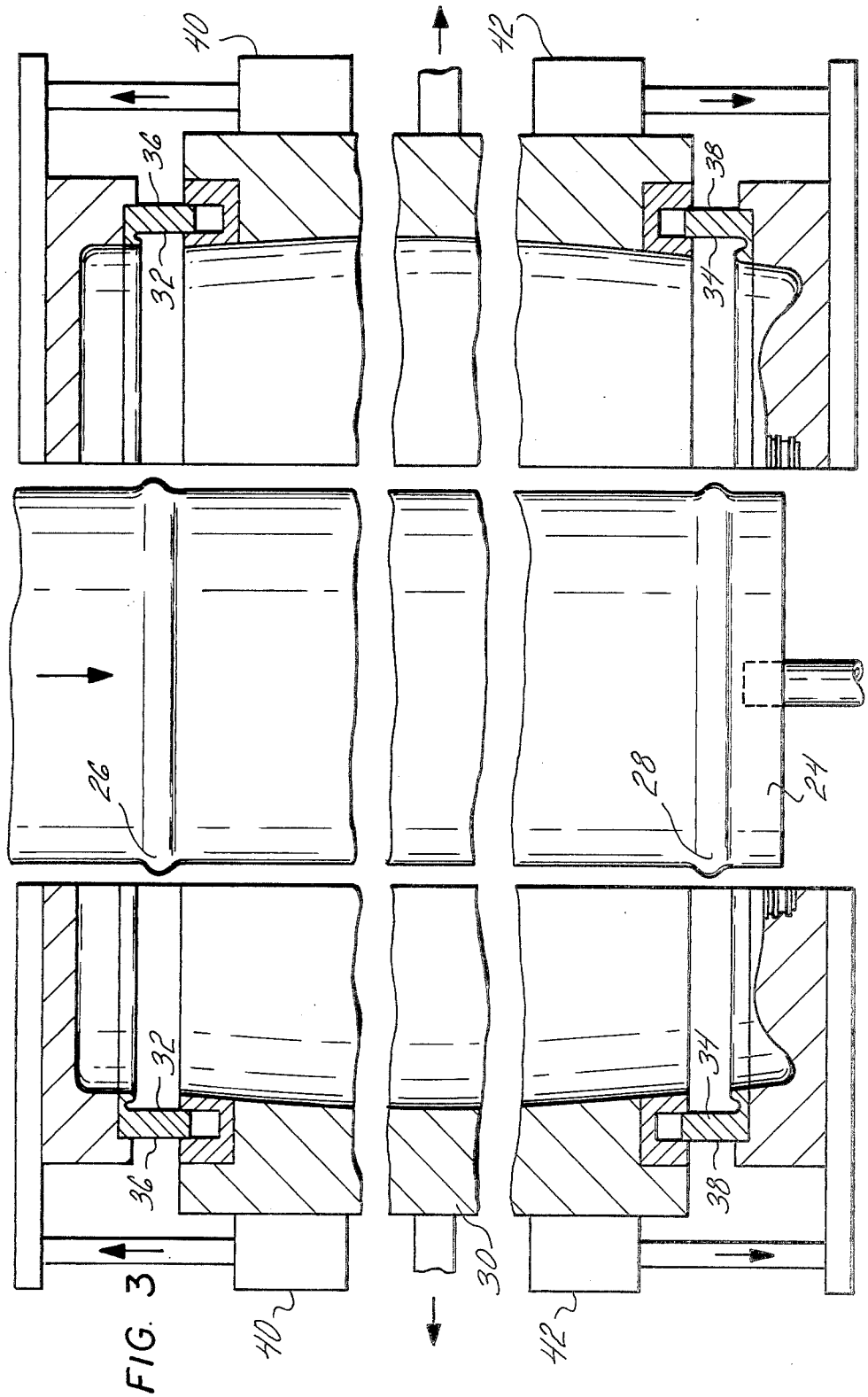
FIG. 3 is a side elevational view of an open blow mold and compression mold shown in section with certain parts broken away and removed and with a lowered parison between the open molds.
Figure 5:
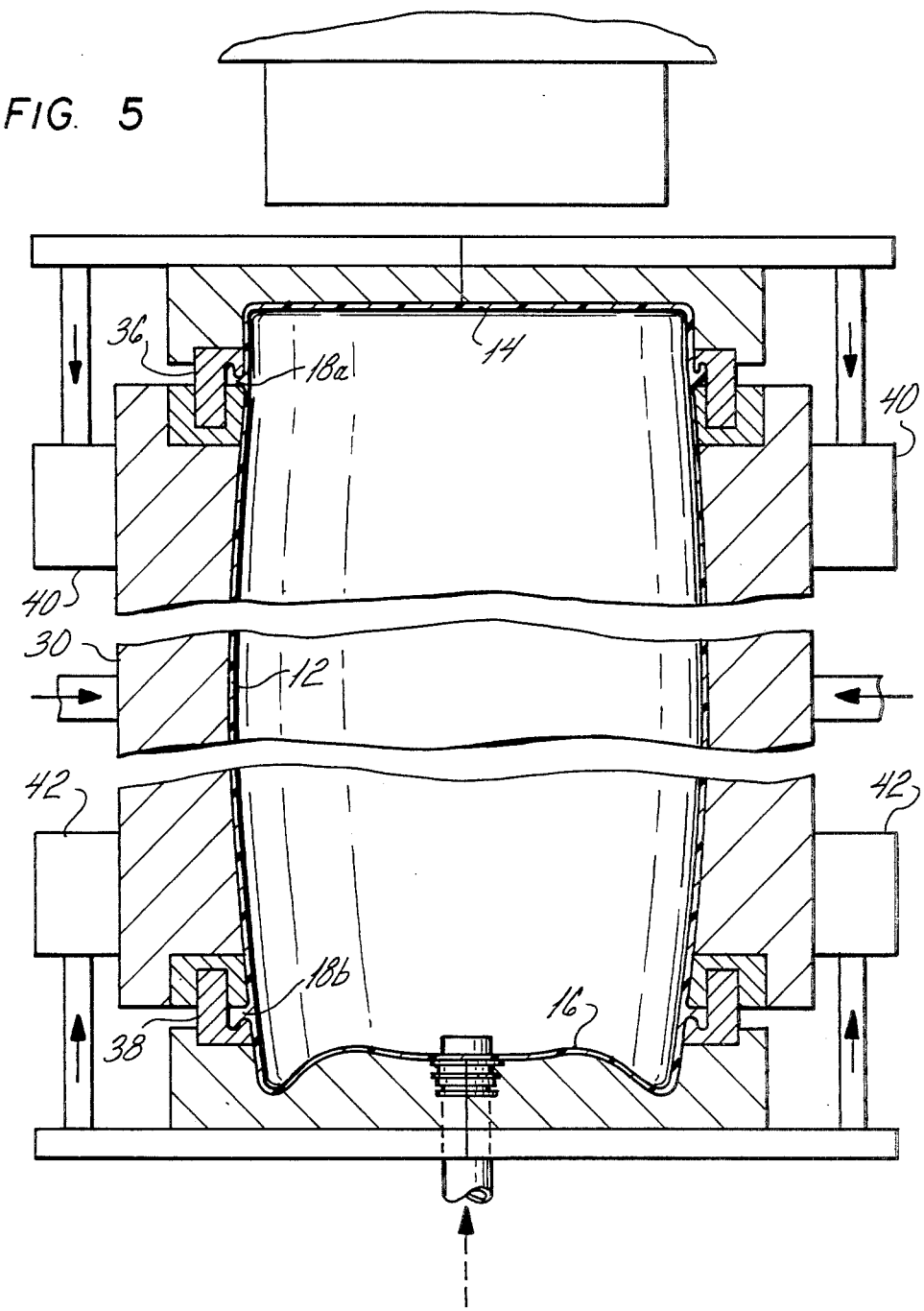
FIG. 5 is a similar view showing the compression mold closed after the blow molding cycle is initiated and while it continues.

In manufacturing the drum 10, a parison 24 is initially extruded, dropped or otherwise formed. Incident to the formation of the parison, predetermined sections 26 and 28 are provided with additional resin forming a heavy or thickened zone in section. The programming of a parison with a heavy section is a technique well known in the blow molding industry. The parison 24 will be disposed between the open blow mold 30 then opened compression molds 36 and 38. The compression molds form part of the blow mold and extend from the cavity surfaces defining the tubular body 12 and bottom closed end 14 and upper closed end 16 (see FIG. 3).

The longitudinally split blow mold 30 is closed about the lowered parison 24 again in a manner well known to those skilled in the art. In this connection, reference is made to commonly assigned U.S. Pat. Nos. 3,212,129 and 3,266,390 for details of blow molding of plastic drums. Upon the closing of the blow mold 30, the internal blowing cycle commences to force the parison of predetermined thickness outwardly against the surfaces of the blow mold to assume the desired configuration of drum. (see FIG. 4)

The thickened sections 26 and 28 are blown into the expanded compression mold cavity 32 and 34, respectively, formed by the respective retracted sections of the compression molds 36 and 38. The movable compression mold section are reciprocal in a longitudinal direction in any one of many ways including the illustrated hydraulic piston-cylinder assembly 40 and 42, respectively. Immediately following the initiation of the blowing cycle, the compression molds 36 and 38 are closed about the respective thickened sections 26 and 28. The actuation of the compression molds follows a suitable time delay in order to permit the expansion of the parison against the surfaces of the blow mold. In a practical application of the present invention, the compression molds are closed approximately five seconds after the start of the blowing cycle. The length of blowing cycle will vary depending upon the wall thickness of the drum. In connection with the practical embodiment, the blowing cycle extended over a period of approximately three minutes for a drum of approximately 55 gallons having a wall thickness of approximately a minimum of ⅛" with the thickness increasing to about ⅜" adjacent the ribs 18a and 18b. The closed compression molds 36 and 38 will advantageously form the ribs 18a and 18b, respectively.

Upon the completion of the molding cycle, the compression molds 36 and 38 retract to their original position. Thereafter, the press opens to open the split blow mold to permit the finished drum 10 to be removed.

The shape and location of the ribs 18a and 18b are determined by the configuration of the compression mold cavity and the positioning of the compression mold within the side walls of the blow mold.

As previously explained the ribs 18a and 18b may also be in the form of rolling hoops or reinforcing gussets requiring the use of the supplemental compression molding technique. These projections can extend completely around the circumferential periphery of the side wall of the drum or can be strategically placed in a given area to provide a handle or hand grip. By the same token, the radial projection need not be at about 90° to the side wall of the drum, but may extend anywhere between 30° and 90° to the side wall.

It should be understood that in addition to the manufacture of drums and containers the present invention is equally applicable to the formation of any other type of hollow article.

Thus the several aforenoted objects and advantages are most effectively attained. Although a single somewhat preferred embodiment of the invention has been disclosed and described in detail herein, it should be understood that this invention is in no sense limited thereby and its scope is to be determined by that of the appended claims.

What is claimed is:

1. A method of molding a plastic drum having at least two outwardly extending projections comprising the steps of:

extruding a tubular parison of resin material having a predetermined wall thickness with at least two sections thereof having an additional amount of resin of increased thickness for formation of the projections and at the same time assure a predetermined wall thickness of the drum adjacent the projections no less than that at the remaining portions of the drum to avoid having a zone of weakness at such locations with the extrusion being programmed to locate each section of additional thickness to facilitate the formation of each of the projections;

utilizing a longitudinally split blow molding for cooperating and forming the selected drum configuration and blow molding the parison into the selected drum configuration when the parison is disposed interiorly of the closed split blow mold, the parison being thus blown into the selected drum configuration during the blow molding cycle and such blowing being continued for a predetermined period of time to assure the formation of the selected drum configuration and the predetermined wall thickness adjacent the projections;

utilizing compression molds forming part of the blow mold with surfaces of the compression mold forming the compression mold cavity being longitudinally reciprocal in essentially the same direction as the longitudinal axis of the blow mold, capturing a predetermined amount of the additional resin in each of the open compression mold cavities upon blowing of the parison; and compression molding the predetermined additional amount of resin into each of the projections upon longitudinally reciprocating the compression mold into its closed position, and at the same time assuring the predetermined wall thickness adjacent the projection, the compression molding of the projection taking place during the blow molding cycle and after the initiation of the blow molding cycle.

2. The invention in accordance with claim 1, wherein the additional amount of resin is in the form of a circumferentially extending thickened section.

3. The invention in accordance with claim 2, wherein the circumferentially extending thickened section is formed into an undercut outwardly projecting rib having a recess which receives and accommodates surfaces of a lifting device for facilitating moving of the drum.

4. The invention in accordance with claim 3, wherein at least two of such ribs are compression molded on the exterior of the drum with one rib being near the top of the drum and the other rib being near the bottom of the drum and each rib recess being open in the direction of the adjacent end of the drum.

5. A method of molding a plastic drum having at least two outwardly extending projections comprising the steps of:

extruding a tubular parison of resin material having a predetermined wall thickness with at least two sections thereof having an additional amount of resin of increased thickness for formation of the projections and at the same time assure a predetermined wall thickness of the drum adjacent the projections no less than that at the remaining portions of the drum to avoid having a zone of weakness at such locations with the extrusion being programmed to locate each section of additional thickness to facilitate the formation of each of the projections;

utilizing a longitudinally split blow molding for cooperating and forming the selected drum configuation and blow molding the parison into the selected drum configuration when the parison is disposed interiorly of the closed split blow mold, the parison being thus blown into the selected drum configuration during the blow molding cycle and such blowing being continued for a predetermined period of time to assure the formation of the selected drum configuration and the predetermined wall thickness adjacent the projections;

utilizing at least one compression mold with surfaces of the compression mold forming the compression mold cavity being longitudinally reciprocal in essentially the same direction as the longitudinal axis of the blow mold, capturing a predetermind amount of the additional resin in each of the open compression mold cavities upon blowing of the parison; and compression molding the predetermined additional amount of resin into each of the projections upon longitudinally reciprocating the compression mold into its closed position, and at the same time assuring the predetermined wall thickness adjacent the projection, the compression molding of the projection taking place after the initiation of the blow molding cycle.

* * * * *